United States Patent [19]

Hahn

[11] E Patent Number: Re. 32,968

[45] Reissued Date of Patent: Jun. 27, 1989

[54] VEHICLE RESTRAINT

[75] Inventor: Norbert Hahn, South Milwaukee, Wis.

[73] Assignee: Abon Corporation, Naples, Fla.

[21] Appl. No.: 131,395

[22] Filed: Dec. 10, 1987

Related U.S. Patent Documents

Reissue of:

[64] Patent No.: 4,560,315
Issued: Dec. 24, 1985
Appl. No.: 629,685
Filed: Jul. 11, 1984

[51] Int. Cl.[4] ..... B65G 69/22

[52] U.S. Cl. ..... 414/401; 14/71.1

[58] Field of Search ..... 414/401, 396, 584; 14/71.1, 69.5, 71.3; 410/58; 104/29, 30

[56] References Cited

U.S. PATENT DOCUMENTS

| | | | |
|---|---|---|---|
| 3,250,408 | 5/1966 | Daniluk et al. | 414/396 |
| 4,264,259 | 4/1981 | Hipp | 414/401 |
| 4,282,621 | 8/1981 | Anthony et al. | 414/401 X |
| 4,400,127 | 8/1983 | Metz | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 414/401 X |
| 4,497,259 | 2/1985 | Titterton | 410/58 X |

*Primary Examiner*—Frank E. Werner

*Assistant Examiner*—David A. Bucci

*Attorney, Agent, or Firm*—Neuman, Williams Anderson & Olson

[57] ABSTRACT

A vehicle restraint is provided for securing a parked vehicle against a loading dock during loading or unloading of the vehicle. The restraint includes a carriage member which is mounted on a dock wall for vertical movement and is biased to assume a predetermined elevated rest position relative to the roadway on which the vehicle is parked. The carriage member moves vertically downwardly from the rest position upon an external force of predetermined magnitude being exerted on an exposed cam surface of the carriage member. An attaching member is adjustably mounted on the carriage member for movement relative thereto between a vehicle locking mode and a vehicle release mode. Adjustably mounted on a lower portion of the carriage member is a toe-like member which normally assumes a pendent position projecting from the carriage member. The toe-like member has an exposed surface portion in an aligned coplanar relation with the carriage member cam surface and forms an extension thereof when the toe-like member assumes its pendent position. The toe-like member is moveable from its normal pendent position [by a reactive force exerted thereon by the roadway] when the carriage member moves vertically downwardly beyond a predetermined distance from its rest position.

24 Claims, 2 Drawing Sheets

VEHICLE RESTRAINT

Matter enclosed in heavy brackets [ ] appears in the original patent but forms no part of this reissue specification; matter printed in italics indicates the additions made by reissue.

BACKGROUND OF THE INVENTION

Proper securing of a parked vehicle to a loading dock during a loading or unloading operation is an essential safety precaution. Various restraints have heretofore been provided to accomplish the desired result by having a portion thereof engaging an ICC bar depending from the rear of the parked vehicle. By reason of the condition of the ICC bar and/or the weight of the load being carried by the vehicle, the height of the ICC bar relative to the roadway may vary 15 or more inches.

Thus, where the restraint incorporates a vertically adjustable carriage member, such as disclosed in U.S. Pat. No. 4,264,259, which is adapted to be engaged by the ICC bar of the vehicle while the latter is backing into position, the carriage member will automatically move downwardly from its upwardly biased rest position the required amount so that the attaching member (hook) mounted on the carriage member can lockingly engage the ICC bar. Heretofore, where the height of the ICC bar was less than 15 inches above the roadway, difficulty was experienced in some instances in that the ICC bar did not engage the cam surface of the carriage member, and thus, the attaching member was not able to engage the ICC bar. In other instances where the carriage member was forced to move downwardly to the fullest extent by the ICC bar of the backing vehicle the bar was forced to move upwardly over the cam surface of the carriage member causing the restraint, the dock wall to which it is attached, as well as the vehicle ICC bar to be subjected to damaging and/or severe stress and strain.

SUMMARY OF THE INVENTION

Thus, it is an object of the invention to provide an improved vehicle restraint which is capable of accommodating ICC bars which vary in height over a range that is greater than the normal 15 inches.

It is a further object of the invention to provide an improved vehicle restraint which has a float of more than 15 inches without sacrificing the stability and structural integrity of the restraint.

It is a still further object to provide an improved vehicle restraint which is easy to install and maintain, and does not cause defacement of or damage to the dock wall, roadway and ICC bar.

Further and additional objects will appear from the description, accompanying drawings and appended claims.

In accordance with one embodiment of the invention, an improved restraint is provided for securing a parked vehicle against the front wall of a conventional loading dock during loading and unloading of the vehicle. The restraint includes a carriage member which is mounted on the dock front wall for vertical movement and is biased to assume a predetermined elevated rest position with respect to the roadway on which the vehicle is parked. Mounted on the carriage member for relative movement between a vehicle locking mode and a vehicle release mode is an attaching member. The carriage member is adapted to move downwardly from its elevated rest position upon an exposed cam surface of the carriage member being engaged by the ICC bar of the vehicle as the latter is being backed into a parked position. Adjustably mounted on the lower portion of the carriage member is a toe-like member which is adapted to normally assume a pendent position wherein it projects outwardly and downwardly from the carriage member. When in the normal pendent position, a peripheral portion of the toe-like member is aligned with and in coplanar relation with the carriage member cam surface; thus, forming an extension thereof. The toe-like member is movable independently of the carriage member from the normal pendent position by a reactive force exerted thereon by the roadway when the carriage member is movable downwardly beyond a predetermined distance from the normal rest position.

DESCRIPTION

For a more complete understanding of the invention reference should be made to the drawings wherein:

FIG. 1 is a fragmentary top perspective view of one embodiment of the improved vehicle restraint shown mounted on a dock front wall and with the attaching member thereof in the vehicle locking mode.

FIG. 2 is a fragmentary side elevational view of the restraint of FIG. 1 but showing the carriage member thereof in a vertically depressed position whereby the toe-like member is engaging and being deflected upwardly by the roadway from its normal pendent position; the attaching member is shown in full lines in locking engagement with the ICC bar of a parked vehicle; the attaching member in a vehicle release mode is shown in phantom lines.

Figure 1:
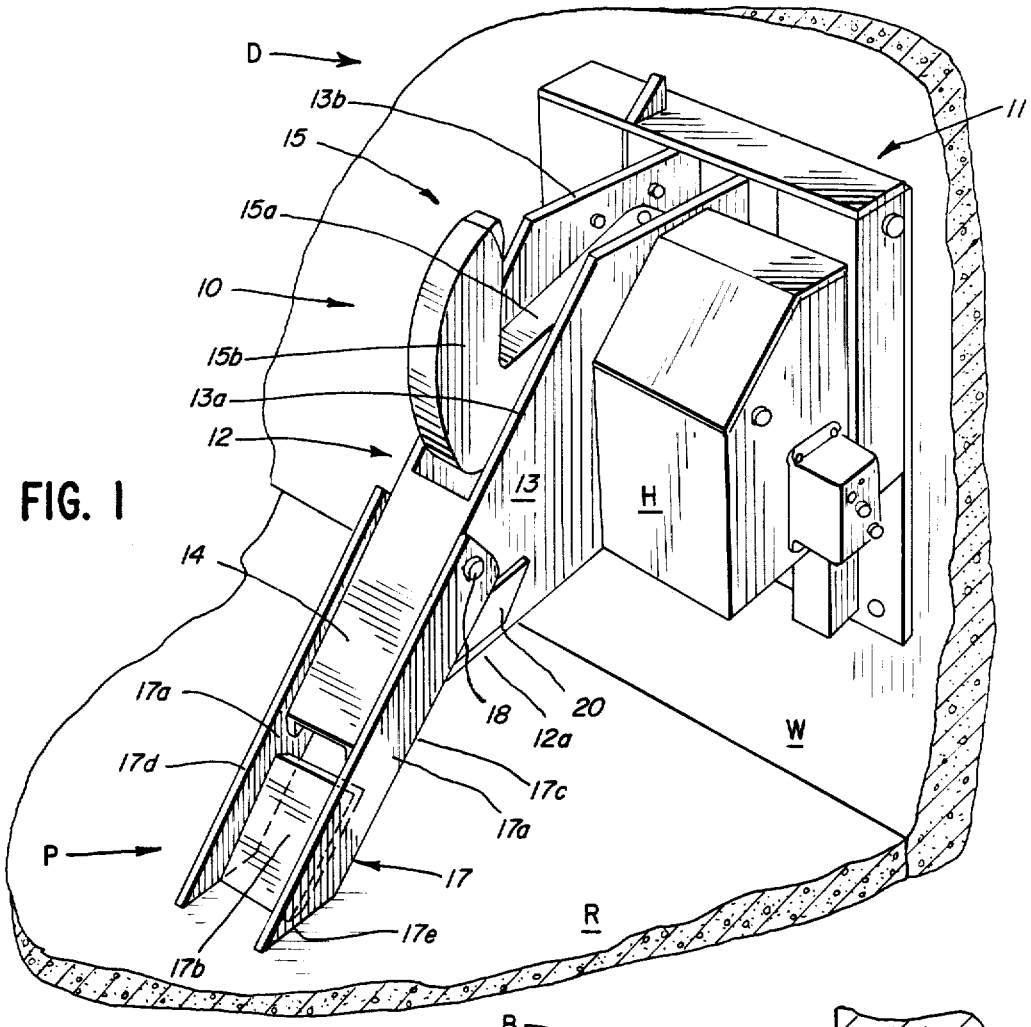
Figure 2:
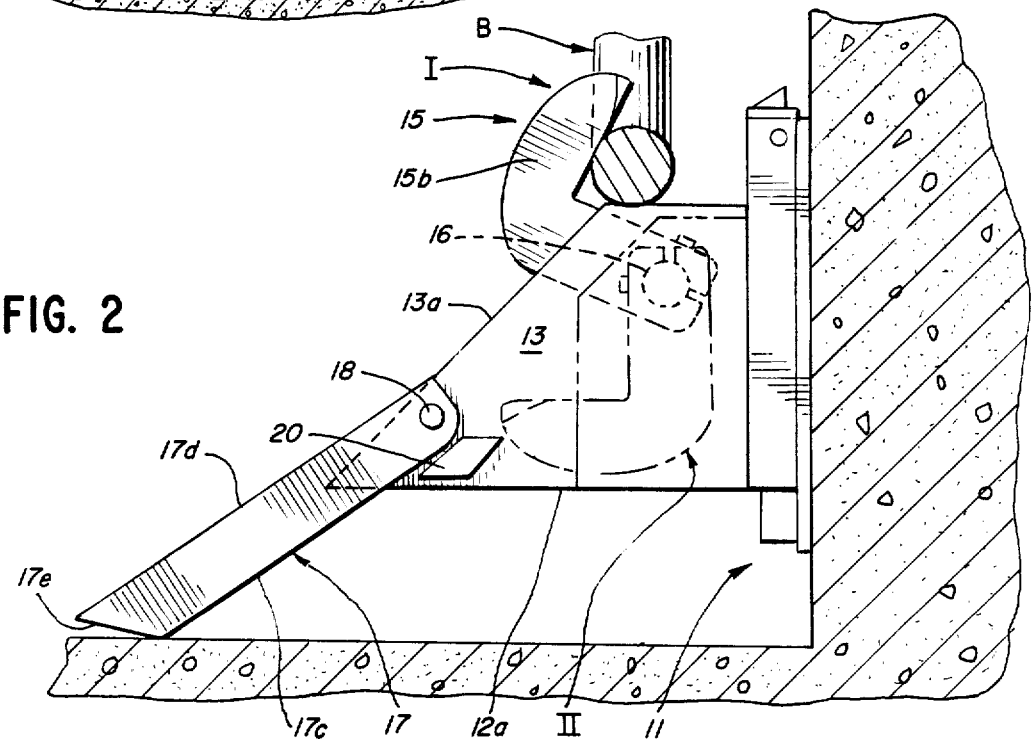

Referring now to FIGS. 1 and 2 a preferred embodiment of an improved vehicle restraint 10 is shown mounted on the front wall W of a conventional loading dock D. The restraint may be used in combination with a dock leveler, not shown, often times incorporated in the loading dock structure.

The restraint 10 includes a mounting assembly 11 which is fixedly secured to wall W by a plurality of anchoring bolts or the like, not shown. The assembly 11 is preferably elevated at or about 17 inches above the roadway R which supports the parked vehicle, not shown. The elevation of the assembly 11 will depend upon the height range of the ICC bars B, see FIG. 2, to be accommodated by the restraint. The maximum height of such bars by government regulation should not exceed 30 inches. The minimum height of the bar will vary (i.e., 13"–16") and will depend upon the condition or state of repair of the bar itself, the styling of the vehicle (i.e., low slung bed) and/or the weight of the load carried by the vehicle.

Mounted for vertical adjustment on the assembly 11 is a carriage member 12. The member 12 is biased by springs or the like, not shown, to normally assume a maximum elevated rest position, as shown in FIG. 1 wherein the underside 12a of the carriage member is disposed at approximately 17 inches above the roadway R. The carriage member 12, as illustrated has a construction similar to that disclosed in U.S. Pat. No. 4,264,259 and includes a pair of plate members 13 arranged in spaced, parallel relation and projecting transversely outwardly from the mounting assembly 11. The outer edges 13a of the plate members 13 are inclined upwardly and inwardly towards the dock wall W and define an exposed cam surface, the purpose of which will be described more fully hereinafter. The upper extremity of the cam surface terminates in substantially horizontally extendin upper edges 13b of the plate members. The plate members are maintained in space parallel relation by a spacer piece 14 which spans the distance between and is secured to the corresponding lower portions of the outer edges 13a of the plate members.

Mounted on the carriage member and moveable therewith, as well as moveable independently thereof is an attaching member 15, sometimes referred to as a hook. The member 15 is disposed between the plate members 13, see FIG. 1. In the illustrated embodiment the attaching member has a substantially J-shape with the end of the long leg 15a thereof pivotally connected by a pivot pin 16 to the plate members, see FIG. 2. The short leg 15b of the attaching member extends transversely from the outer end of the leg 15a so that when the member 15 is in a vehicle locking mode I, FIG. 2, the ICC bar B will be hooked—that is to say, the bar is captured between the short leg 15b and the mounting assembly 11. Normally, the bar B will rest upon the upper edges 13b of the plate members 13, when it is in locking relation with the attaching member 15.

When the attaching member 15 is in the vehicle release mode II (shown in phantom lines, FIG. 2) it is concealed within the carriage member so that the cam surface will not be obstructed by any portion of the attaching member.

Mounted on one side of the carriage member 12 and moveable therewith as a unit is a housing H in which is disposed a drive motor and gear box, not shown, for moving the attaching member 15 from the release mode II to the lock mode I. A control panel, not shown, for controlling actuation of the motor is normally remotely located relative to the restraint and is under the supervision of loading dock personnel thus, providing added safety for the personnel in that the parked vehicle is locked in place before commencing a loading or unloading operation.

Figure 3:
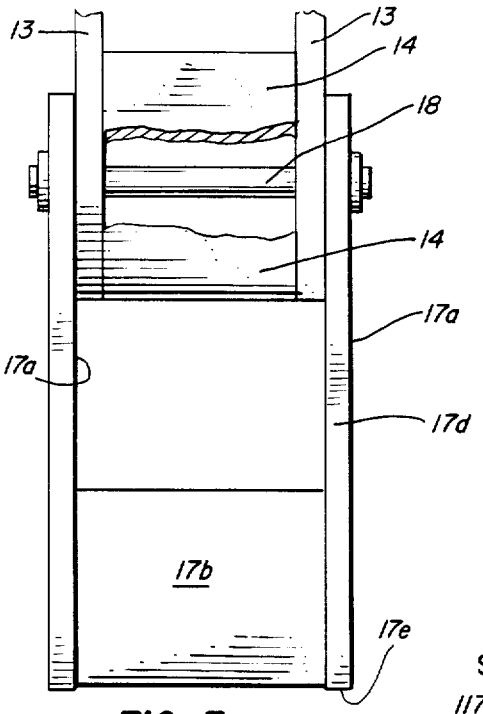
FIG. 3 is an enlarged fragmentary front view of the restraint of FIG. 1 and showing only the lower portion of the carriage member and the toe-like member disposed in a normal pendent position.

Mounted on the lower portion of the carriage member is an adjustable toe-like member 17 which is biased preferably by the force of gravity to assume a normal pendent position P wherein the member 17 projects outwardly and downwardly from the outer lower corner of the carriage member, see FIG. 1. Member 17 as seen in FIGS. 1–3 includes a pair of elongated side rails or arms 17a which are disposed in spaced parallel relation. The upper portions of the side rails 17a overlie and engage the exterior surface of the plate members 13 and are pivotally connected thereto by a common, transversely extending pivot pin 18, see FIG. 3. The lower portions of the side rails 17a project beyond the underside 12a of the carriage member and are interconnected by a spacer piece 17b.

Mounted on the exterior surface of each plate member 13 is a stop piece 20. Each piece is disposed in the vicinity of, but spaced from the pivot pin 18 and is adapted to abut the backside 17c of the corresponding side rail 17a and prevent further counter-clockwise movement of the toe-like member 17 once it has assumed its normal pendent position P. When the backsides of the side rails are abutting the stop pieces 20, the front side 17d of each side rail is in aligned coplanar relation with the cam surface formed by the edges 13a of the plate members and form an extension thereof. The distance the lower portions of the side rails project from the underside of the carriage member will depend upon the least elevated ICC bar B, the restraint 10 is intended to engage when the carriage member is disposed in the normal elevated rest position. When the carriage member is in the normal rest position and the toe-like member 17 is in the normal pendent position, the ICC bar B of the backing vehicle will initially contact either the front side 17d of the member 17 or the inclined edges 13a of the plate member 13 and as the vehicle continues its backward movement, the force exerted by the bar on the carriage member will overcome the upward bias force exerted on the carriage member 12 and cause the latter to automatically move downwardly. As the carriage member moves downwardly the front sides 17d and the cam surface will slide past the bar until the latter engages the top edges 13b of the plate members 13. When the bar reaches such a position relative to the carriage member, the attaching member 15 is activated to its locking mode I by dock personnel manually starting the drive motor from the control panel. Once the member 15 is in the locking mode and the bar B is captured thereby, a visual or audible signal, not shown, may be energized at the control panel and the dock wall W indicating to both the dock personnel and the vehicle driver that a safe condition exists for loading or unloading of the vehicle.

As the [carraige] *carriage* member 12 moves downwardly a predetermined distance (e.g., 16") from its normal rest position due to the external force applied thereto by bar B, the ends 17e of the side rails 17a will contact the roadway R and a reactive force will be exerted by the latter causing the toe-like member 17 to pivot or be deflected in a clockwise direction about pivot pin 18 and thus, avoid any serious stress or strain developing within the restraint itself, the ICC bar, the dock front wall, or the roadway R.

Figure 4:
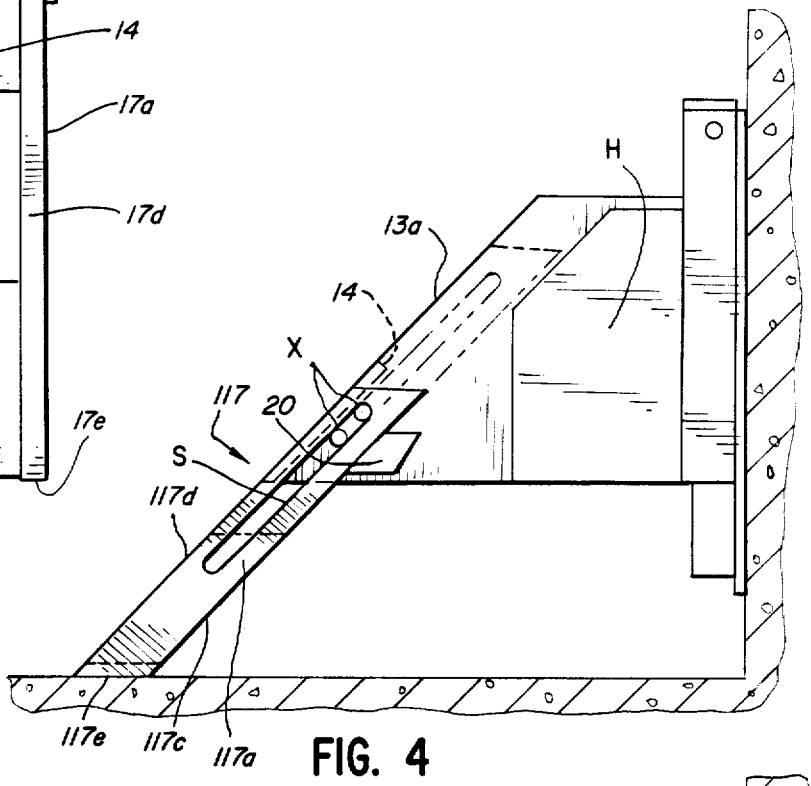
FIG. 4 is a fragmentary side elevational view of a second embodiment of the improved vehicle restraint with the toe-like member thereof shown in a normal pendent position, the toe-like member in a fully retracted position is shown in phantom lines.

FIG. 4 illustrates a second version 117 of the toe-like member which is mounted on the lower portions of the plate members 13. Instead of member 117 being pivotally connected to the carriage member, it is mounted for a substantially telescoping movement between a fully extended position (shown in full lines in FIG. 4) and a fully retracted position (shown in phantom lines in FIG. 4). Member 117 has a construction similar to that of member 17, except that each side rail 117a of member 117 is provided with an elongated longitudinally extending slot S; each slot is of like configuration. Disposed within each slot and sized so as to permit each side rail to move only in a direction longitudinally of the slot, is a pair of pintles X which are affixed to and project outwardly from the exterior surface of the adjacent plate member 13. In lieu of a pair of pintles, a single lug, not shown, having elongated facetted side edges in sliding contact with the elongated sides of the slot may be utilized. The free lower ends of the side rails 117a are interconnected by a transversely extending spacer 117b. A stop piece 20 mounted on the plate member exterior surface is in contact with the backside 117c of the side rail 117a and resists twisting movement of the toe-like member when it is in contact with an ICC bar, or when it is moving to a retracted position due to the reactive force of the roadway exerted on the end 117e of the side rail.

Figure 5:
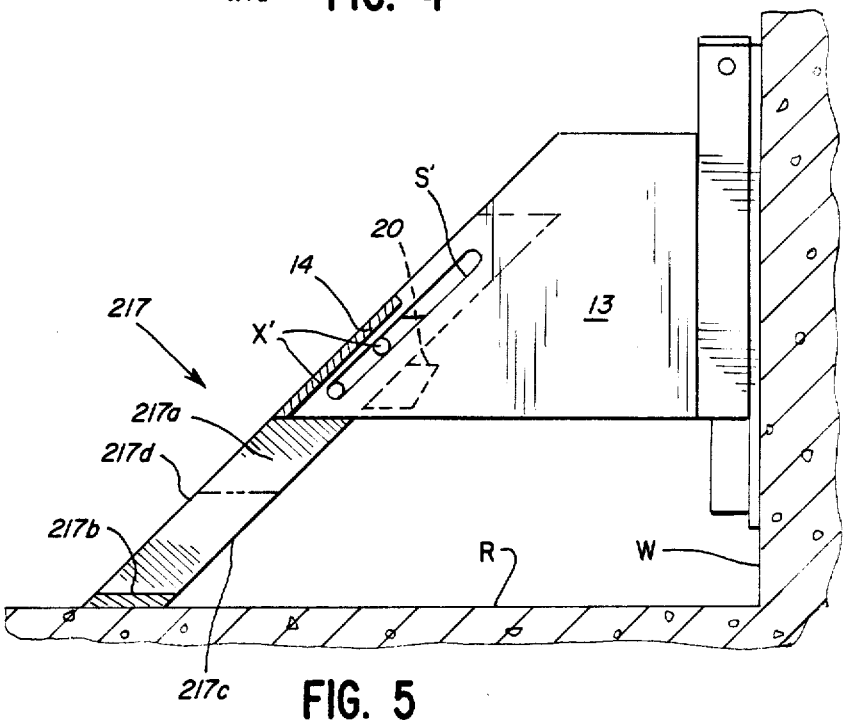
FIG. 5 is a fragmentary vertical sectional view showing a third embodiment of the improved vehicle restraint; the toe-like member in a fully retracted position is shown in phantom lines.

A third version 217 of the toe-like member is shown in FIG. 5 and is similar to member 117 of FIG. 4, except that the elongated slots S' are formed in the plate members 13 and the pairs of pintles X' are provided on the interior surfaces of the side rails 217a.

In both versions of the toe-like member 117 and 217, the front edges 117d and 217d of the side rails remain in coplanar relation at all times with the cam surface-forming edges 13a of the plate members 13.

Thus, it will be seen that an improved vehicle restraint has been disclosed which is capable in a simple, yet effective manner, of accommodating a veriety of ICC bars having a wider than normal range of height variations and at the same time avoids serious stresses and strains developing within the restraint, the ICC bar, the dock front wall and the roadway.

I claim:

1. In a vehicle restraint for securing a vehicle parked on a roadway to an adjacent wall of *a* loading dock wherein the restraint has a carriage member mounted for vertical movement on the dock wall and being biased to assume a predetermined elevated rest position relative to the roadway, the carriage member being moveable vertically downwardly from the rest position upon an external force of a predetermined magnitude being exerted on an exposed cam surface of the carriage member, and an attaching member mounted on the carriage member for movement relative thereto between a vehicle locking mode and a vehicle release mode; the improvement comprising means adjustably mounted on said carriage member and normally assuming a pendent relative position wherein an exposed portion thereof forms an extension of the carriage member cam surface; said means being moveable independently of said carriage member from the normal pendent position by a reactive force exerted thereon by a portion of the roadway upon the carriage member being moveable vertically downwardly beyond a predetermined distance from the rest position.

2. The improvement of claim 1 wherein the adjustably mounted means includes a toe-like member mounted on said carriage member to normally assume an outwardly and downwardly extending pendent position relative to a lower portion of said carriage member.

3. The improvement of claim 2 wherein the toe-like member is pivotally mounted on the carriage member.

4. The improvement of claim 2 wherein the toe-like member is provided with a peripheral surface portion which is aligned with the carriage member cam surface, when said toe-like member assumes the normal outwardly and downwardly extending pendent position.

5. The improvement of claim 2 wherein the toe-like member is slidably mounted on a lower portion of the carriage member for movement between a fully extended position and a fully retracted position; when in a fully extended position, said toe-like member projecting downwardly and outwardly from the carriage member whereby a peripheral portion of the toe-like member is in substantially coplanar relation with the cam surface of said carriage member.

6. The improvement of claim 2 wherein the toe-like member is moveable independently of the attaching member.

7. The improvement of claim 2 wherein the force of gravity causes the toe-like member to normally assume the pendent position relative to the lower portion of the carriage member.

8. The improvement of claim 3 including stop means adapted to coact with the carriage member and the toe-like member to limit pivotal movement of the latter in one direction whereby same assumes a predetermined normal pendent position.

9. The improvement of claim 5 wherein the toe-like member and the carriage member are interconnected by an assembly having an elongated slot formed on one of the members and complemental pin means on the other member being sized relative to said slot whereby said pin means extends into the slot and is moveable only longitudinally thereof as said toe-like member moves between said fully extended and fully retracted positions.

*10. In a vehicle restraint for securing a vehicle parked on a roadway to an adjacent wall of a loading dock wherein the restraint has a carriage member mounted for vertical movement on the dock wall and biased to assume a predetermined elevated rest position relative to the roadway, the carriage member being movable vertically downwardly from the rest position upon an external force of a predetermined magnitude being exerted on an exposed cam surface of the carriage member, and an attaching means mounted on the carriage member for movement relative thereto between a vehicle locking mode and a vehicle release mode;, the improvement comprising toe means adjustably mounted on said carriage member and normally assuming a pendent relative position extending below the carriage member whereby an exposed portion thereof forms an extension of the carriage member cam surface, said toe means being movable relative to said carriage member from the normal pendent position upon the carriage member being moved vertically downward below a predetermined spaced position relative to the roadway.*

*11. The improvement of claim 10 wherein the adjustably mounted toe means includes a toe-*like member mounted on said carriage member to normally assume an outwardly and downwardly extending pendent position relative to a lower portion of said carriage member.

*12. The improvement of claim 11 wherein the toe-like member is pivotally mounted on the carriage member.*

*13. The improvement of claim 11 wherein the toe-like member is provided with a peripheral surface portion which is aligned with the carriage member cam surface, when said toe-like member assumes the normal outwardly and downwardly extending pendent position.*

*14. The improvement of claim 11 wherein the toe-like member is slidably mounted on a lower portion of the carriage member for movement between a fully extended position and a fully retracted position; when in a fully extended position, said toe-like member projecting downwardly and outwardly from the carriage member whereby a peripheral portion of the toe-like member is in substantially coplanar relation with the cam surface of said carriage member.*

*15. The improvement of claim 11 wherein the toe-like member is movable independently of the attaching member.*

*16. The improvement of claim 11 wherein the force of gravity causes the toe-like member to normally assume the pendent position relative to the lower portion of the carriage member.*

*17. The improvement of claim 12 including stop means adapted to coact with the carriage member and the toe-like member to limit pivotal movement of the latter in one direction whereby the toe-like member assumes the predetermined normal pendent position.*

*18. The improvement of claim 14 wherein the toe-like member and the carriage member are interconnected by an assembly having an elongated slot formed on one of the members and complemental pin means on the other member being sized relative to said slot whereby said pin means extends into the slot and is moveable only longitudinally thereof as said toe-like member moves between said fully extended and fully retracted positions.*

*19. In a vehicle restraint system, the combination comprising: a roadway for parked vehicles, a loading dock including a loading surface above said roadway and an upright wall connecting the roadway and the loading surface, and a vehicle restraint mounted on said upright wall, said restraint including a carriage member mounted for vertical movement on the upright wall, said carriage member being biased to assume a predetermined elevated rest position relative to the roadway, the carriage member having an exposed cam surface and being movable vertically downwardly from the rest position upon an external force of a predetermined magnitude being exerted on said cam surface, an attaching means mounted on the carriage member for movement relative thereto and cooperating therewith to establish a vehicle locking mode and a vehicle release mode, and toe means adjustably mounted on said carriage member and normally assuming a pendent position wherein an exposed portion thereof forms an extension of the carriage member cam surface, said toe means being movable relative to said carriage member from the normal pendent position upon the carriage member being moved vertically downward below a predetermined spaced position relative to the roadway.*

*20. The improvement of claim 19 wherein the adjustably mounted toe means includes a toe-like member mounted on said carriage member to normally assume an outwardly and downwardly extending pendent position relative to a lower portion of said carriage member.*

*21. The improvement of claim 20 wherein the force of gravity causes the toe-like member to normally assume the pendent position relative to the lower portion of the carriage member.*

*22. In a vehicle restraint for securing a vehicle on a roadway to an adjacent wall of a loading dock wherein the restraint has a carriage member mounted for vertical movement on the dock wall and biased to assume a predetermined elevated rest position relative to the roadway, the carriage member being movable vertically downwardly from the rest position upon an external force of a predetermined magnitude being exerted on an exposed cam surface of the carriage member, and an attaching means mounted on the carriage member for movement relative thereto and cooperating therewith to define a vehicle locking mode and a vehicle release mode; the improvement comprising toe means adjustably mounted on said carriage member and normally assuming a pendent relative position extending below the carriage member whereby an exposed portion thereof forms an extension of the carriage member cam surface, stop means maintaining said toe means in said pendent position to form said extension, said toe means being movable relative to said carriage member from the normal pendent position to a position spaced from said stop means upon the carriage member being moved vertically downward below a predetermined spaced position relative to the roadway.*

*23. In a vehicle restraint for securing a vehicle parked on a roadway to an adjacent wall of a loading dock wherein the restraint has a carriage member mounted for vertical movement on the dock wall and biased to assume a predetermined elevated rest position relative to the roadway, the carriage member being movable vertically downwardly from the rest position upon an external force of a predetermined magnitude being exerted on an exposed cam surface of the carriage member, and an attaching member mounted on the carriage member for movement relative thereto between a vehicle locking mode and a vehicle release mode; the improvement comprising toe means on said carriage member, pivot means supporting said toe means on said carriage member, stop means maintaining said toe means in a pendent position to form a downward extension of said cam surface, said toe means being movable relative to said carriage member from the normal pendent position to a position spaced from said stop means upon the carriage member being moved vertically downward below a predetermined spaced position relative to the roadway.*

*24. In a vehicle restraint for securing a vehicle parked on a roadway to an adjacent wall of a loading dock wherein the restraint has a carriage member mounted for vertical movement on the dock wall and biased to assume a predetermined elevated rest position relative to the roadway, the carriage member being movable vertically downwardly from the rest position upon an external force of a predetermined magnitude being exerted on an exposed cam surface of the carriage member, and an attaching member mounted on the carriage member for movement relative thereto between a vehicle locking mode and a vehicle release mode; the improvement comprising toe means on said carriage member, pivot means supporting said toe means on said carriage member, stop means maintaining said toe means in a pendent position to form a downward extension of said cam surface, said toe means being rotatable about said pivot means relative to said carriage member from said pendent position determined by said stop means to an elevated position in response to movement of said carriage member downwardly below a predetermined spaced position relative to the roadway.*

* * * * *